(12) United States Patent
Wei et al.

(10) Patent No.: US 12,532,894 B2
(45) Date of Patent: *Jan. 27, 2026

(54) SPRAY DRYING METHODS AND ASSOCIATED FOOD PRODUCTS PREPARED USING THE SAME

(71) Applicants: Xiong Wei, Kunshan (CN); Yu Fang, Kunshan (CN); Chen Yiqiang, Kunshan (CN)

(72) Inventors: Xiong Wei, Kunshan (CN); Yu Fang, Kunshan (CN); Chen Yiqiang, Kunshan (CN)

( * ) Notice: Subject to any disclaimer, the term of this patent is extended or adjusted under 35 U.S.C. 154(b) by 585 days.

This patent is subject to a terminal disclaimer.

(21) Appl. No.: 18/078,282

(22) Filed: Dec. 9, 2022

(65) Prior Publication Data

US 2024/0188578 A1 Jun. 13, 2024

(51) Int. Cl.
| | |
|---|---|
| *A23B 2/93* | (2025.01) |
| *A23B 7/022* | (2006.01) |
| *A23B 7/026* | (2006.01) |
| *A23L 2/38* | (2021.01) |
| *A23L 2/39* | (2006.01) |
| *A23L 2/74* | (2006.01) |
| *A23L 19/00* | (2016.01) |

(52) U.S. Cl.
CPC ............ *A23B 7/026* (2013.01); *A23B 2/93* (2025.01); *A23B 7/022* (2013.01); *A23L 2/382* (2013.01); *A23L 2/39* (2013.01); *A23L 2/74* (2013.01); *A23L 19/01* (2016.08); *A23L 19/09* (2016.08)

(58) Field of Classification Search
CPC ........... A23B 7/026; A23B 7/022; A23B 2/93; A23B 2/48–485; A23L 2/382; A23L 2/39; A23L 2/74; A23L 19/09; A23L 19/01
See application file for complete search history.

(56) References Cited

U.S. PATENT DOCUMENTS

| | | | |
|---|---|---|---|
| 2,994,085 A | | 7/1961 | Teich et al. |
| 3,782,975 A | | 1/1974 | Zyss |
| 3,966,974 A | | 6/1976 | Bharucha et al. |
| 4,113,885 A | | 9/1978 | Zyss |
| 4,305,963 A | * | 12/1981 | Nakagawa ................ A23L 2/84 |
| | | | 426/16 |
| 4,335,143 A | * | 6/1982 | Wiener ..................... A23L 2/62 |
| | | | 426/50 |

(Continued)

FOREIGN PATENT DOCUMENTS

| | | |
|---|---|---|
| CN | 1139342 C | 2/2004 |
| CN | 1326471 C | 7/2007 |

(Continued)

OTHER PUBLICATIONS

Translation of CN 101891173A (Year: 2010).*

*Primary Examiner* — Drew E Becker

(74) *Attorney, Agent, or Firm* — King & Partners, PLC

(57) ABSTRACT

A method for drying a food product that results in a highly homogenous, low-moisture content powder having significantly reduced particle size without materially altering the flavor profile and/or the nutritional profile of the food product, including the steps of: (1) providing a food product, wherein the food product comprises a fermentation liquid; (2) optionally filtering the food product; and (3) controllably spray drying the food product at high-temperature.

14 Claims, 1 Drawing Sheet

(56) References Cited

U.S. PATENT DOCUMENTS

| | | | | |
|---|---|---|---|---|
| 4,361,589 A | * | 11/1982 | Wauters | A23B 7/08 |
| | | | | 426/321 |
| 4,438,147 A | * | 3/1984 | Hedrick, Jr. | A23G 9/20 |
| | | | | 426/585 |
| 4,806,373 A | | 2/1989 | Stumpf et al. | |
| 5,980,957 A | * | 11/1999 | Nishinomiya | A23L 27/14 |
| | | | | 426/60 |
| 6,010,725 A | * | 1/2000 | Meister | C12N 1/04 |
| | | | | 426/471 |
| 6,444,246 B1 | * | 9/2002 | Popplewell | A23L 27/16 |
| | | | | 426/321 |
| 11,071,304 B2 | | 7/2021 | Husgen et al. | |
| 2004/0166179 A1 | * | 8/2004 | Anzaghi | A23L 2/39 |
| | | | | 424/766 |
| 2005/0163880 A1 | * | 7/2005 | Pusateri | A23L 33/105 |
| | | | | 435/41 |
| 2006/0147556 A1 | * | 7/2006 | Brewer | A23L 19/01 |
| | | | | 424/725 |
| 2008/0305213 A1 | * | 12/2008 | Husgen | A23B 4/20 |
| | | | | 426/652 |
| 2011/0039002 A1 | * | 2/2011 | Verkoeijen | A23D 7/011 |
| | | | | 426/601 |
| 2012/0156355 A1 | | 6/2012 | Milne et al. | |
| 2013/0115331 A1 | * | 5/2013 | Silver | A23G 4/06 |
| | | | | 426/4 |
| 2013/0126102 A1 | * | 5/2013 | Kitamura | B01D 1/20 |
| | | | | 159/48.1 |
| 2014/0275465 A1 | * | 9/2014 | Garikipati | C07C 31/207 |
| | | | | 528/68 |
| 2017/0318855 A1 | * | 11/2017 | Mott | A23K 10/20 |
| 2019/0329148 A1 | * | 10/2019 | Schwenzow | B01D 1/20 |
| 2021/0059282 A1 | * | 3/2021 | Dalgaard | A23L 33/21 |
| 2021/0153539 A1 | * | 5/2021 | Li | A23L 25/30 |
| 2021/0345649 A1 | | 11/2021 | Soma et al. | |
| 2021/0386101 A1 | * | 12/2021 | Soma | A23L 13/432 |
| 2022/0022474 A1 | | 1/2022 | Husgen et al. | |
| 2022/0046961 A1 | * | 2/2022 | Sherman | A23B 2/93 |
| 2022/0295824 A1 | * | 9/2022 | Frederix | A23J 3/346 |
| 2022/0369679 A1 | * | 11/2022 | Kang | A23L 19/01 |
| 2024/0260595 A1 | * | 8/2024 | Charest | A23B 2/75 |
| 2024/0284944 A1 | * | 8/2024 | Wei | A23L 19/01 |
| 2024/0284948 A1 | * | 8/2024 | Wei | A23B 7/026 |

FOREIGN PATENT DOCUMENTS

| | | |
|---|---|---|
| CN | 102166006 | 8/2011 |
| CN | 102524359 | 7/2012 |
| CN | 102224910 | 1/2013 |
| CN | 103960604 | 8/2014 |
| CN | 104082699 | 10/2014 |
| CN | 105725090 | 7/2016 |
| CN | 105767834 | 7/2016 |
| CN | 110465368 | 11/2019 |

* cited by examiner

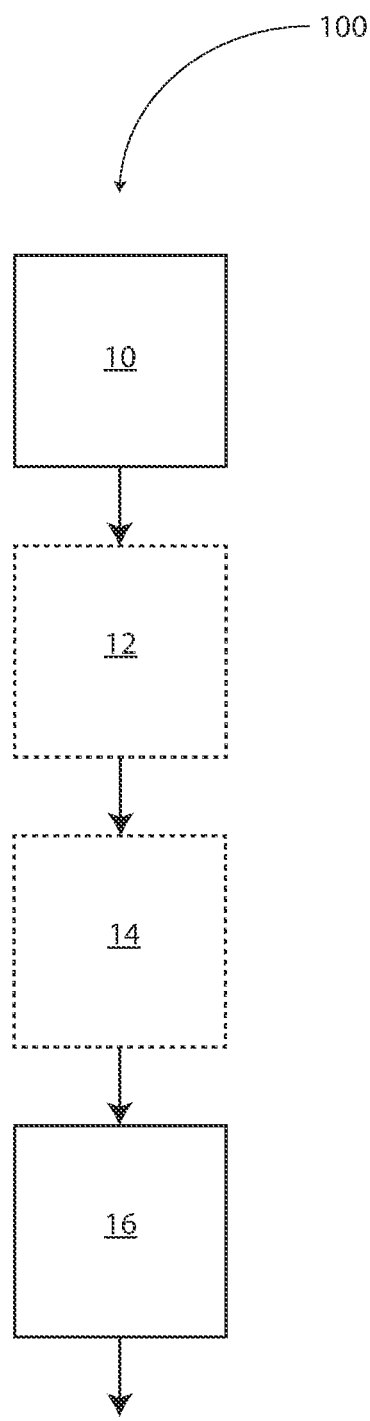

SPRAY DRYING METHODS AND ASSOCIATED FOOD PRODUCTS PREPARED USING THE SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to drying methods for food products and, more particularly, to drying fermentation liquids via high-temperature (HT) spray drying at both ambient and elevated pressures.

The spray drying methods of the present invention provide for highly homogenous, low-moisture content celery powders having significantly reduced particle size. These physical characteristics allow the celery powders to be more easily used in seasoning blends, reduce clogging of injection needles, and increase dispersibility in, for example, brines. Moreover, the spray drying methods of the present invention result in immediately finished products without subsequent processing, which can increase the risk of contamination, caking, and clumping. Notably, the spray drying methods of the present invention do not materially alter the flavor profile and/or the nutritional profile of the food product.

2. Background Art

Methods for making celery powder have been known in the art for years and are the subject of a plurality of patents and/or publications, including: Chinese Patent Number 110465368 entitled "A Kind of Processing Method of Celery Powder," Chinese Patent Number 105767834 entitled "Preparation Method of Instant Celery Tablets," Chinese Patent Number 105725090 entitled "Composite Celery Powder Pickling Agent," Chinese Patent Number 104082699 entitled "Preparation Method of Fermented Celery Powder Based on Natural Preserving," Chinese Patent Number 103960604 entitled "Pure Nature Low Temperature Baked Cooked Celery Powder and Production Method Thereof," Chinese Patent Number 102524359 entitled "Celery Powder Nitrite and Industrial Preparation Method Thereof," Chinese Patent Number 102224910 entitled "Method for Producing Food Ingredient Rich in Nitrite and Flavonoid by Use of Celery Leaves," Chinese Patent Number 102166006 entitled "Method for Making Celery Powder," Chinese Patent Number 1326471C entitled "Natural Celery Powder and Its Making Process," and Chinese Patent Number CN1139342C entitled "Method for Preparing Concentrated Dry Celery Powder by Freeze Drying Technology"—all of which are hereby incorporated herein by reference in their entirety including all references cited therein.

Chinese Patent Number 110465368 appears to disclose methods for processing celery powder. The process equipment includes a main grinding machine, a secondary grinding machine, a first level inner circulating tube, a second level inner circulating tube, an outer circulating tube, a cyclone dust collector, a sack cleaner, a returning charge conveyer, and a gas treatment branch. The exit flow of the secondary grinding machine imports the centrifugal blower fan blade wheel rotation of the impact kinetic energy recycling main grinding machine of the impeller-driven in the feed pipe of the main grinding machine. The outlet of outer circulating tube connects with the entrance of main grinding machine. The import of the outer circulating tube is the air inlet. There are feed opening and returning charge entrances on the outer circulating tube. The air inlet of the cyclone dust collector connects with the secondary mill entrance. The cyclone dust collector exhaust outlet connects with the air inlet of the sack cleaner. The material undergoes high speed grinding and discharges moisture by the cyclone dust collector and the sack cleaner. The conveying drying/grinding machine is pneumatically driven, and the kinetic energy is recycled. The nutritional characteristics of the product remain intact.

Chinese Patent Number 105767834 appears to disclose a method of deep processing vegetables and a method of instantly preparing celery tablets. The preparation process includes the following four steps: celery treatment, celery liquid preparation, celery powder preparation and pure powder tablet production. First, celery is clean processed. Second, the clean celery is exposed to scalding hot water. Third, the celery is placed into a mixing beater where it becomes a celery slurry. Next, the celery slurry is filtered and then spray-dried into celery powder with a spray dryer. Finally, honey water is added into the celery powder while stirring the mixture. The stirred mixture is put into a tablet press machine to produce celery powder tablets, and the celery powder tablets are put into a drying baker to be dried, thereby obtaining the finished product of the instant celery tablets.

Chinese Patent Number 105725090 appears to disclose a composite celery powder pickling agent which is prepared from the following components: 100-200 mg/kg of pomegranate peel polyphenols, 0.2-0.4% of celery powder, 270-330 mg/kg of vitamin C, 360-440 mg/kg of tea polyphenol, 150-250 mg/kg of bamboo leaf flavonoid and 150-320 mg/kg of *Salvia officinalis* extract powder. The bamboo leaf flavonoid, tea polyphenol, user-made celery powder, user-made *Salvia officinalis* extract powder and pomegranate peel polyphenols are compounded to prepare the pickling agent. Then the residual amount of nitrite in the pickled meat product can be effectively reduced, and meanwhile the quality of the pickled meat product can be improved.

Chinese Patent Number 104082699 appears to disclose a method for naturally preparing fermented celery powder having the following steps, namely: (1) the celery powder is prepared; (2) strain addition, to be more specific, inoculating SACCO Lyocarni WBL-45 composite strain in amount of 2.36*10⁷ CFU/g to obtain a mixed solution; (3) fermentation celery powder preparation, to be more specific, putting the mixed solution into a constant temperature oscillator for uniform-speed oscillation with the speed controlled in 150 r/min at 38° C., taking the mixed solution out every 30 min, using a sodium hydroxide solution to adjust the pH of the mixed solution to 7-7.1, putting the mixed solution back to the constant temperature oscillator to continue fermentation, after the fermentation is performed for 12 h, taking the mixed solution out, using a vacuum freezing dryer for 48 h of dehydration to obtain the fermented celery powder. The preparation method has the advantages of simple and easy operation, low production cost and controllable production quality, the prepared fermented celery powder is high in the nitrite content, and the preparation method is suitable for the requirement of industrial production.

Chinese Patent Number 103960604 appears to disclose a pure nature low temperature baked celery powder, and a production method thereof. The production method comprises: carrying out screening, root removing, washing, leaf removing, immersing and blanching, and dewatering on fresh celery, cutting the celery into leaves, small branches and celery stems, respectively adopting boiling salt water with a temperature of more than or equal to 95° C. to immerse and blanch until achieving a semi-transparent state, taking out, dewatering, cutting into slices, respectively carrying out 50-60° C. constant temperature vacuum baking processing on the dewatered celery leaves. The dewatered small branches and the cut celery slices are baked at low temperature to obtain sterilized, dried celery. The dried celery is grinded into celery powder with a particle fineness of more than or equal to 120 mesh through a crushing machine. According to the present invention, the cold drug-nature of the celery is neutralized, the original taste, the nutritional components and the good color of the celery are maintained, the powder presents the microscopic porous structure, has good rehydration, can be directly taken for a long time through infusion with boiling water, and can further be used as the preparation material of food, beverages and traditional Chinese medicine.

Chinese Patent Number 102524359 appears to disclose a celery powder nitrite and an industrial preparation method thereof. According to the industrial preparation method, the celery powder nitrite is a powdery substance prepared from celery by the steps of raw material treatment, blanching and de-enzyme processing, dehydrating and crushing, bio-nitrifying, drying and caking and secondary crushing, wherein the powdery substance has the bio-nitrite content of 0.5%-1.2%, the water content of 3%-5% and the powder fineness of 50-120 meshes. Nitrite in celery is converted into vegetal nitrite by adopting a biological conversion technology with the conversion rate up to 80-85%. The industrial preparation method is a green deep processing high-efficiency comprehensive utilization technology in the extended industrial chain of cress, and the celery powder nitrite is an ideal vegetal nitrite in the traditional food-grade nitrites and can be used as a natural ingredient of meat products.

Chinese Patent Number 102224910 appears to disclose a method for producing a food ingredient rich in nitrite and flavonoid by use of celery leaves, belonging to the field of vegetable deep-processing technology. According to the invention, the celery leaves are used as a raw material which is subjected to sorting and cleaning, decoloring, pulping, microbial conversion, drying and crushing. A food ingredient product celery powder is produced which contains 1.8% of nitrite, 3.5% of flavonoid and less than or equal to 5% of water. The food ingredient celery powder can be used for processing meat products, and has effects of protecting color, resisting oxidation and eliminating free radicals. If the celery powder prepared by the method disclosed by the invention accounts for 0.75%, the equivalent amount of nitrite and residual amount of nitrite in meat products both meet the requirements of GB2760-2007.

Chinese Patent Number 102166006 appears to disclose a method for making celery powder which comprises the steps of: screening fresh celeries as raw material, and then heating to inactivate enzymes; protecting the color in a zinc acetate solution and an ascorbic acid solution; drying; and finally crushing, screening, vacuum-packaging and sterilizing the treated celery to obtain a celery powder finished product. The product has a clear green color, rich nutrition and long shelf life.

Chinese Patent Number 1326471 appears to disclose a natural celery powder and a method for making the same. The present invention also relates to a natural celery powder preparation for keeping original color and high nutritive value of fresh celery and a preparing method thereof. The natural celery powder of the present invention solves the problems of poor color and poor solubility existing in the present celery processed products. The present invention has the technical scheme that a wet process is adopted; fresh celery used as main raw material is cleaned, cut, precooked for protecting color, pulped, milled into colloid, processed by secondary treatment, compounded, homogenized, sterilized, concentrated, dried, processed in a powder collection mode, screened, packaged and warehoused so as to obtain the powdery celery product. The whole process is completed in a mechanical continuous operation mode. The product of the present invention has the advantages of good taste, bright color, high solution speed and rich nutrient component. Original color, fragrance, and taste of the fresh celery are preserved.

Chinese Patent Number CN1139342C appears to disclose a method for preparing concentrated celery powder through a freeze-drying technique. The present invention is characterized in that: (a) celery is extracted into juice and is filtered, (b) the filtered celery juice is put in a vacuum freeze drier (−5° C. to 25° C.), and (c) the temperature is raised to 20° C. to 35° C. for 28 to 48 hours while, at the same time, vacuum drying, so a dried solid of which the water content does not exceed 5 to 15% is obtained.

While the above-identified patents and publications do appear to disclose various methods for making celery powder, their methods remain non-desirous and/or problematic inasmuch as, among other things, none of the above-identified references appear to disclose spray drying methods that provide for highly homogenous, low-moisture content celery powders having significantly reduced particle size without materially altering the flavor profile and/or the nutritional profile of the food product.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a method for drying a food product that results in a highly homogenous, low-moisture content powder having significantly reduced particle size without materially altering the flavor profile and/or the nutritional profile of the food product, comprising, consisting essentially of and/or consisting of the steps of: (a) providing a food product, wherein the food product comprises a fermentation liquid; (b) optionally filtering the food product; and (c) controllably spray drying the food product.

In a preferred embodiment of the present invention, the step of providing a food product includes providing a celery fermentation liquid.

In another preferred embodiment of the present invention, the step of providing a food product includes providing an aqueous fermentation medium comprising a celery fermentation liquid, yeast powder, peptone, sodium chloride, and water.

In one preferred embodiment of the present invention, the step of optionally filtering the food product includes filtering through a coiled filtration membrane that removes particles greater than approximately (+/−10%) 2 microns, and more preferably greater than approximately (+/−10%) 0.5 microns, and yet more preferably greater than approximately (+/−10%) 0.005 microns.

In a preferred aspect of the present invention, the step of controllably spray drying the food product at high-temperature includes the step of spray drying via a centrifugal spray dryer.

In this embodiment, the step of controllably spray drying the food product at high-temperature preferably includes maintaining an air inlet temperature from between approximately (+/−10%) 220 to approximately (+/−10%) 240 degrees Centigrade, maintaining an air outlet temperature from between approximately (+/−10%) 100 to approximately (+/−10%) 140 degrees Centigrade, maintaining an atomization frequency from between approximately (+/−10%) 3,500 r/m to approximately (+/−10%) 3,700 r/m at ambient pressure. Spray dryers for use in accordance with the present invention are commercially available from, for example, Hovione (Loures, Portugal), Aveka (Woodbury, Minnesota), and SPX Flow (Charlotte, North Carolina).

In a preferred implementation of the present invention, the step of controllably spray drying the food product at high-temperature includes the step of spray drying via a pressure spray dryer. In this embodiment, the step of controllably spray drying the food product at high-temperature preferably includes maintaining an air inlet temperature from between approximately (+/−10%) 180 to approximately (+/−10%) 220 degrees Centigrade, maintaining an air outlet temperature from between approximately (+/−10%) 100 to approximately (+/−10%) 120 degrees Centigrade, maintaining an atomization pressure from between approximately (+/−10%) 100 MPa to approximately (+/−10%) 120 MPa.

In another preferred implementation of the present invention, the step of controllably spray drying the food product at high-temperature results in a Karl Fischer moisture content of less than approximately (+/−0.1%) 2% without materially altering the flavor profile and/or the nutritional profile of the food product.

In yet another preferred implementation of the present invention, the method further comprises the step of associating a filler with the food product simultaneously with and/or prior to the step of controllably spray drying. In this embodiment, the filler comprises sea salt present in a concentration between approximately (+/−0.1%) 0.5% and approximately (+/−0.5%) 3%.

In a preferred embodiment of the present invention, the method further comprises the step of associating an anticoagulant with the food product simultaneously with and/or prior to the step of controllably spray drying. In this embodiment, the anticoagulant comprises silicon dioxide and/or an alkyl dimethicone cross-polymer present in a concentration between approximately (+/−0.010%) 0.025% and approximately (+/−0.5%) 5%.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

The invention will now be described with reference to the drawings wherein:

FIG. 1 of the drawings is a schematic representation of a method for spray drying a food product according to the present invention.

DETAILED DESCRIPTION OF THE INVENTION

While this invention is susceptible of embodiment in many different forms and applications, there are shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

The methods of the present invention provide for highly homogenous (e.g., small particle size distribution), low-moisture (e.g., less than approximately (+/−0.1%) 2%) content celery powders having significantly reduced particle size (e.g., 0.005 to 2 microns). It will be understood that these physical characteristics allow the celery powders to be more easily used in seasoning blends, reduce clogging of injection needles, and increase dispersibility in, for example, brine solutions. Moreover, the spray drying methods of the present invention result in an immediately finished product without subsequent processing, which can increase the risk of contamination, caking, and clumping. Notably, the spray drying methods of the present invention do not materially alter the flavor profile and/or the nutritional profile of the food product.

Referring now to the drawings, and to FIG. 1 in particular, a first embodiment of method 100 is shown as generally comprising the steps of: (10) providing a food product, wherein the food product comprises a fermentation liquid (e.g., celery, beets, etcetera); (12) optionally controllably exposing the food product to ultra-high-temperature and/or an electromagnetic radiation source to pasteurize, sanitize, and/or sterilize the food product; (14) optionally filtering the food product; and (16) controllably spray drying the food product. Method steps 10-16 may be carried out simultaneously and/or in any sequential order.

The food products of the present invention preferably comprise celery fermentation liquid including celery, yeast powder (0.3-0.7%), peptone (0.1-0.5%), sodium chloride (0.1-0.3%), and water (Q.S. 100%), and the fermentation medium of the present invention preferably comprise celery juice (25-40%), yeast powder (0.5-5.0%), peptone (0.1-0.5%), sodium chloride (0.1-1.0%), disodium hydrogen phosphate dodecahydrate (0.1-0.5%), and water (Q.S. 100%).

In accordance with the present invention, optional step 14 of method 100 includes controllably exposing the food product to ultra-high-temperature processing which includes the step of exposing the food product to flash heating via a direct heating system (e.g., an injection-based system, an infusion-based system, etcetera) and/or an indirect heating system (e.g., plate exchangers, tubular exchangers, scraped-surface exchangers, etcetera). These systems are commercially available from, for example, Tetra Pak (Pully, Switzerland). These systems provide for controllably exposing the food product to ultra-high-temperature processing for a period of time such as heating the food product to at least approximately 135 degrees Centigrade for between approximately (+/−10%) one and approximately (+/−10%) ten seconds, and more preferably to at least approximately (+/−10%) 148 degrees Centigrade for between approximately (+/−10%) one and approximately (+/−10%) three seconds.

The methods of the present invention, optionally include the step of controllably exposing the food product to an electromagnetic radiation source. Preferably, the electromagnetic radiation source which is substantially mercury free and/or substantially free from generating ozone during operation of the same. Suitable examples of electromagnetic radiation sources include, but are not limited to, those commercially available from Pro Mach (Cincinnati, Ohio). In one embodiment, the electromagnetic radiation source comprises pulsed UV-B electromagnetic radiation. In this embodiment, the food product is exposed to electromagnetic radiation having a pulse duration of less than approximately (+/−10%) 10 milliseconds, and more preferably less than approximately (+/−10%) 5 milliseconds, and yet more preferably less than approximately (+/−10%) 2 milliseconds. Moreover, the food product is preferably exposed to electromagnetic radiation for a total duration of less than approximately (+/−10%) 30 seconds, and more preferably less than approximately (+/−10%) 5 seconds, and yet more preferably lees than approximately (+/−10%) 2 seconds.

In one aspect of the present invention, the step of controllably exposing the food product to electromagnetic radiation for a period of time preferably comprises controllably exposing the food product to pulsed electromagnetic radiation having a percent transmission of less than approximately 80% at below approximately 240 nanometers.

In another aspect of the present invention, the ultra-high-temperature flash exposure and/or the electromagnetic radiation source pasteurizes, sanitizes, and/or sterilizes the food product by providing a greater than approximately (+/−1 Log) 8 Log reduction in undesirable matter in less than approximately (+/−10%) 1 to approximately (+/−10%) 10 seconds.

Method 100 of the present invention, also optionally includes step 16 for filtering the food product through a coiled filtration membrane that removes particles greater than approximately 2 microns, and more preferably greater than approximately 0.50 microns, and yet more preferably greater than approximately 0.005 microns.

In accordance with the present invention, method 100 includes step 16 for controllably spray drying the food product. In one embodiment, the step of controllably spray drying the food product at high-temperature includes the step of spray drying via a centrifugal spray dryer. In this embodiment, the step of controllably spray drying the food product at high-temperature preferably includes maintaining an air inlet temperature from between approximately 220 to approximately 240 degrees Centigrade, maintaining an air outlet temperature from between approximately 100 to approximately 140 degrees Centigrade, maintaining an atomization frequency from between approximately 3,500 r/m to approximately 3,700 r/m at ambient pressure. In another embodiment of the present invention, the step of controllably spray drying the food product at high-temperature includes the step of spray drying via a pressure spray dryer. In this embodiment, the step of controllably spray drying the food product at high-temperature preferably includes maintaining an air inlet temperature from between approximately 180 to approximately 220 degrees Centigrade, maintaining an air outlet temperature from between approximately 100 to approximately 120 degrees Centigrade, maintaining an atomization pressure from between approximately 100 MPa to approximately 120 MPa.

Step 16 preferably results in a food product having a Karl Fischer moisture content of less than approximately 2% without materially altering the flavor profile and/or the nutritional profile of the food product.

Step 16 may also comprise the step of associating a filler with the food product simultaneously with and/or prior to the step of controllably spray drying. Non-limiting examples of filler material include sea salt, Himalayan salt, Kosher salt, potassium chloride, and sodium chloride. Preferably, the concentration of the filler ranges from approximately (+/−5%) 15% to approximately (+/−5%) 40%.

Step 16 may also include the step of associating an anticoagulant with the food product simultaneously with and/or prior to the step of controllably spray drying. In one embodiment, the anticoagulant preferably comprises silicon dioxide present in a concentration between 0.025% and 5%. In another embodiment, the anticoagulant comprises an alkyl dimethicone cross-polymer present in a concentration between 0.025% and 5%, such as those disclosed in United States Patent Application Publication Number 2013/0115331 A1 entitled "Alkyl Dimethicone Cross-polymer Additive to Chewing Gum and Chewing Gum Having Alkyl Dimethicone Cross-polymer—which is hereby incorporated herein by reference in its entirety including all references cited therein.

The invention is further described by additional examples and experiments hereinbelow.

Example I

This embodiment describes the drying process of celery powder. Use centrifugal spray drying equipment to dry the configured materials as required. The inlet and outlet air temperature is 220° C.-240° C. and 100° C.-140° C., respectively. The atomization frequency is set as 3500 r/m to obtain fermented celery powder with 2% moisture. The weight yield of centrifugal spray drying is 95% and the content yield is 100%. The flavor and nutritional profiles remain unchanged.

Example II

This embodiment also describes the drying process of celery powder. Use pressure equipment to dry the configured materials as required. The inlet and outlet air temperature is 180° C.-220° C. and 100° C.-120° C., respectively. The atomization pressure is set as 100 MPa to obtain fermented celery powder with 2.5% moisture. The weight yield of pressure drying is 98% and the content yield is 100%. The flavor and nutritional profiles remain unchanged.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A method for drying a food product comprising the steps of:
    providing a fermentation liquid comprising celery;
    filtering the fermentation liquid through a membrane that removes particles greater than 0.5 microns; and
    spray drying the filtered fermentation liquid using a pressure spray dryer operating at an atomization pressure from 100 MPa to 120 MPa and an inlet temperature from 180 degrees Centigrade to 220 degrees Centigrade; and wherein the spray drying produces a celery powder having an average particle size of less than 0.5 microns and a moisture content of less than 2% by weight.

2. The method according to claim 1, wherein the step of providing a fermentation liquid includes providing an aqueous fermentation liquid comprising, celery, yeast powder, peptone, sodium chloride, and water.

3. The method according to claim 1, wherein the fermentation liquid comprises celery juice, yeast powder, peptone, sodium chloride, disodium hydrogen phosphate dodecahydrate, and water.

4. The method according to claim 1, wherein the step of filtering the fermentation liquid includes filtering through a coiled filtration membrane that removes particles greater than 0.5 microns.

5. The method according to claim 1, wherein the step of controllably spray drying the includes maintaining an air inlet temperature from 180 degrees Centigrade to 220 degrees Centigrade, maintaining an air outlet temperature from between approximately 100 degrees Centigrade to 120 degrees Centigrade, and maintaining an atomization pressure from 100 MPa to 120 MPa.

6. The method according to claim 1, further comprising the step of associating a filler with the food product simultaneously with and/or prior to the step of controllably spray drying.

7. The method according to claim 6, wherein the filler comprises sea salt.

8. The method according to claim 7, wherein the concentration of the sea salt is from 15% to 40% by weight.

9. The method according to claim 1, further comprising the step of associating an anticoagulant with the food product simultaneously with and/or prior to the step of controllably spray drying.

10. The method according to claim 9, wherein the anticoagulant comprises silicon dioxide.

11. The method according to claim 10, wherein the concentration of the silicon dioxide ranges from 0.025% to approximately 5% by weight.

12. The method according to claim 9, wherein the anticoagulant comprises an alkyl dimethicone cross-polymer.

13. A method for drying a celery fermentation liquid, consisting of the steps of:
    providing an aqueous fermentation liquid consisting of celery juice in an amount of 25-35% by weight, yeast powder in an amount of 0.3-0.7% by weight, peptone in an amount of 0.1-0.5% by weight, sodium chloride in an amount of 0.1-0.3% by weight, disodium hydrogen phosphate dodecahydrate in an amount of 0.1-0.3% by weight, and water;
    filtering the fermentation liquid through a membrane that removes particles greater than 0.5 microns; and spray drying the filtered liquid at an atomization pressure of 100-120 MPa with an inlet temperature of 180-220 degrees Centigrade to produce a powder having an average particle size of less than 0.5 microns.

14. A method, consisting of the steps of:

fermenting celery in a fermentation medium for 24 to 48 hours at 37 degrees Centigrade;

filtering the resulting fermentation liquid through a membrane removing particles greater than 0.5 microns;

spray drying the filtered liquid using atomization at 100 to 120 MPa with an inlet temperature of 180 to 220 degrees Centigrade and an outlet temperature of 100 to 120 degrees Centigrade; and collecting a powder product having an average particle size less than 0.5 microns and a moisture content less than 2% by weight.

* * * * *